United States Patent [19]

Parker, Jr.

[11] 4,307,683
[45] Dec. 29, 1981

[54] METHOD AND APPARATUS FOR HANDLING SHACKLED POULTRY

[76] Inventor: Alonzo E. Parker, Jr., 1031 S. Plum St., Durham, N.C. 27701

[21] Appl. No.: 142,085

[22] Filed: Apr. 21, 1980

Related U.S. Application Data

[63] Continuation-in-part of Ser. No. 912,726, Jun. 5, 1978, Pat. No. 4,215,654.

[51] Int. Cl.³ ............................................. A01K 37/00
[52] U.S. Cl. ................................................. 119/97 R
[58] Field of Search .......................... 119/97 R, 82, 17

[56] References Cited

U.S. PATENT DOCUMENTS 1,347,397  7/1920  Newman ............................... 119/17
3,260,239  7/1966  Sanders ............................. 119/97 R
3,796,192  3/1974  Parker, Jr. ........................ 119/97 R
4,084,714  4/1978  Williams ........................... 119/17 X Primary Examiner—Hugh R. Chamblee
Attorney, Agent, or Firm—B. B. Olive

[57] ABSTRACT

A mechanized method and apparatus for handling shackled live poultry is based on receiving the live poultry in shackles at the farm, conveying the shackles containing the live poultry to carts designed to receive and transport large numbers of the shackles, loading and transporting the carts from the farm to the processing plant and at the processing plant conveying the shackles from the carts to the processing conveyor and transferring the shackles to the processing conveyor for processing of the shackled live poultry while being conveyed on the processing conveyor.

9 Claims, 14 Drawing Figures

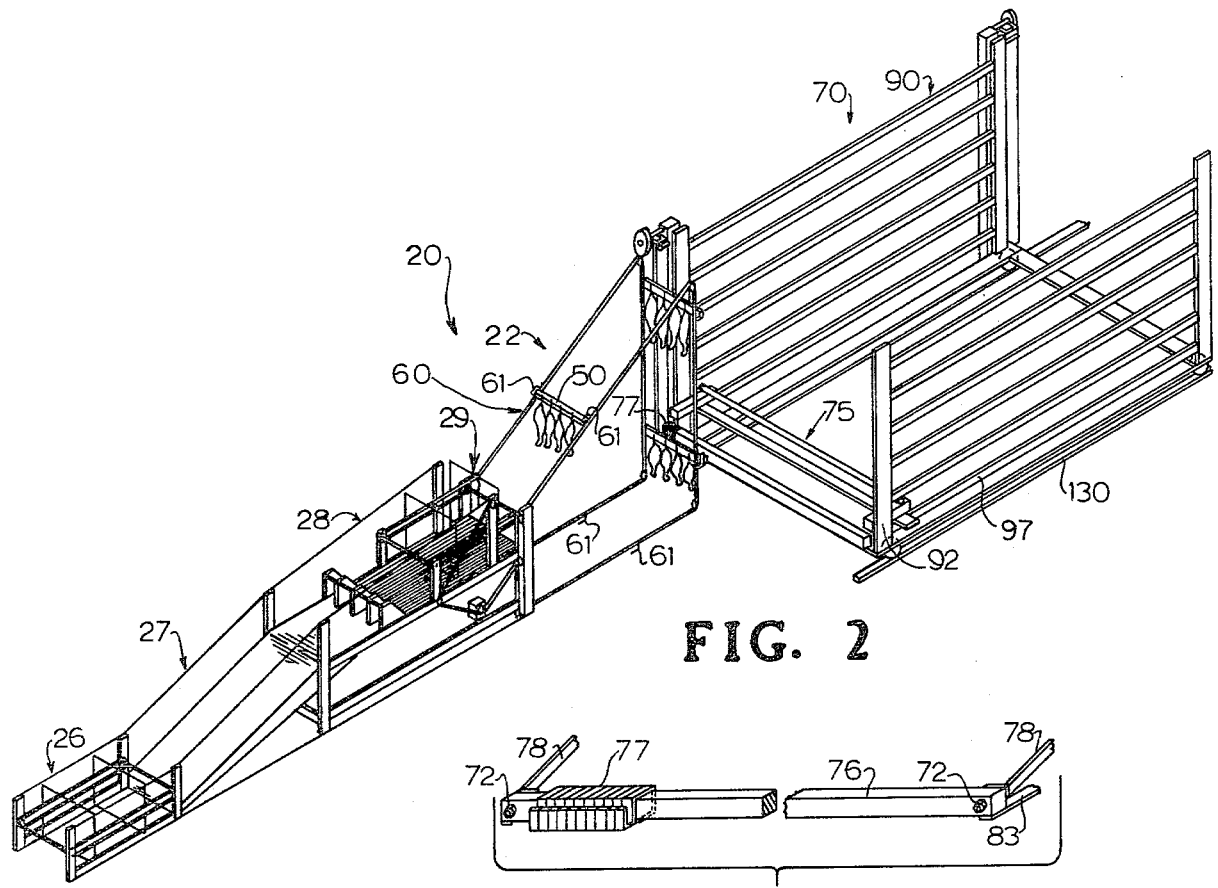
FIG. 2
FIG. 2A
FIG. 2B
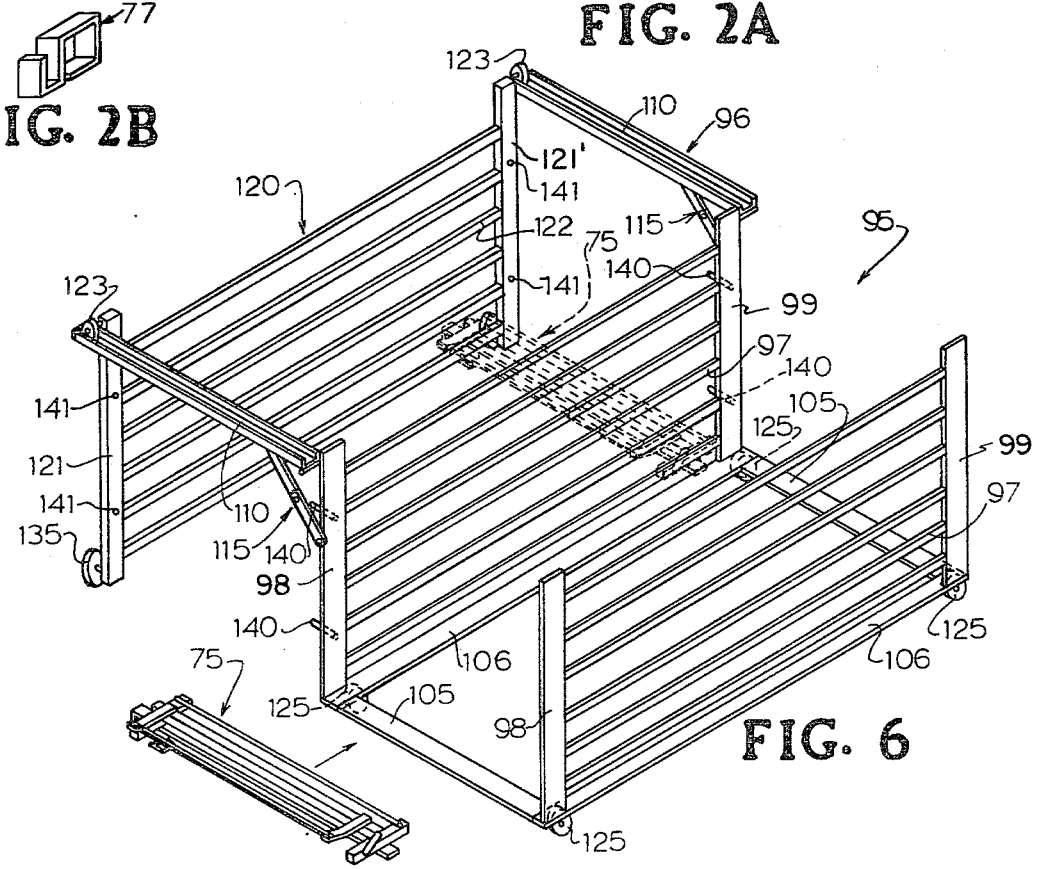
FIG. 6

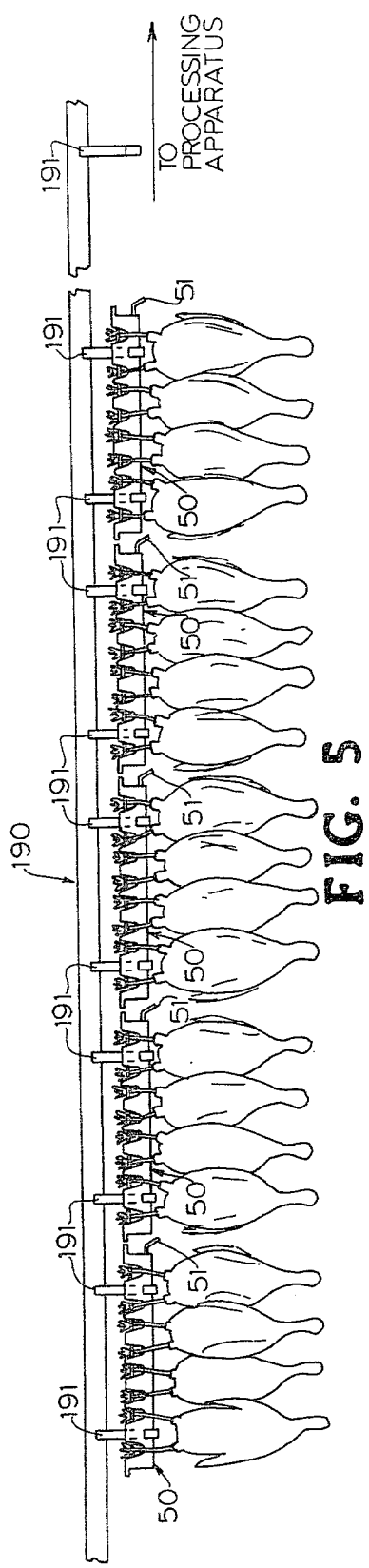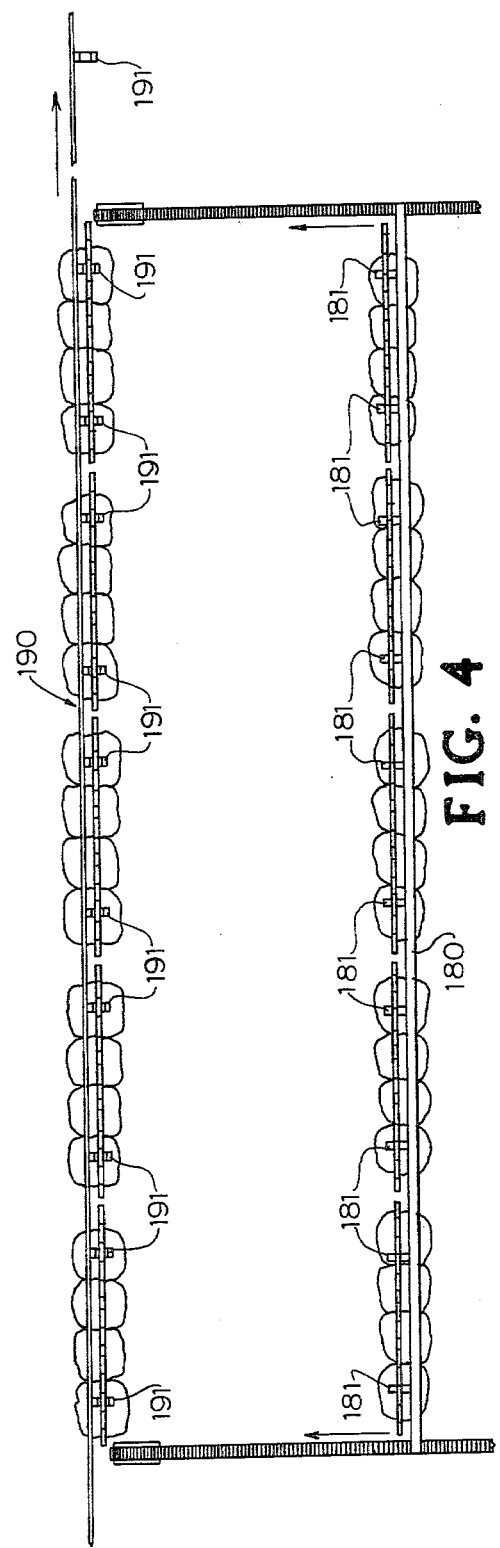

METHOD AND APPARATUS FOR HANDLING SHACKLED POULTRY

CROSS-REFERENCE TO RELATED APPLICATION

This application is a continuation-in-part of copending application Ser. No. 912,726, filed June 5, 1978, entitled "SHACKLING SYSTEM AND METHOD FOR LIVE POULTRY", now U.S. Pat. No. 4,215,654.

BACKGROUND OF THE INVENTION

1. Field of the Invention

The invention relates to methods and apparatus for handling live shackled poultry between the farm and the processing plant.

2. Description of the Prior Art

The traditional way of catching and cooping live poultry for transport to the processing plant is a dirty, undesirable and labor consuming task. Catching crews must work during nighttime hours, physically catch the live poultry, load the poultry into coops, transfer the filled coops onto a transport vehicle, transport the poultry to the processing plant, remove the coops at the poultry processing plant and finally transfer the live poultry onto shackles and to a processing conveyor for delivery into the processing plant.

Prior to applicant's U.S. Pat. No. 3,796,192, no attempt had been made to deliver already shackled live poultry to the processing plant. While this patent teaches a shackle adapted to manual gathering and shackling at the farm and use of the shackle to suspend the poultry on the processing line, it does not teach a mechanical systm and method for gathering and conveying the poultry on foot into the shackle. In this regard, the method and apparatus of copending application Ser. No. 912,726 provides a system for mechanically gathering and shackling of live poultry on foot at the farm and for delivering mechanically gathered and shackled poultry to a processing plant.

To complete the discussion of the prior art, reference is made to the discussion of additional prior art noted in applicant's prior U.S. Pat. No. 3,796,192 as well as in applicant's copending application Ser. No. 912,726 and such discussion will be deemed incorporated herein by reference.

With applicant's prior contributions and the mentioned additional prior art in mind, the object of the present invention thus becomes that of providing improved apparatus and method for handling shackled live poultry between the shackling station and the processing plant and particularly to provide improved conveying method and apparatus at the farm and processing plant and improved means for transporting the shackled live poultry from the farm to the processing plant in the paired limb, side-by-side array.

SUMMARY OF THE INVENTION

The invention apparatus and method provides a conveyor for conveying shackled live poultry from shackling apparatus of the type described in applicant's copending application Ser. No. 912,726 to a specially designed cart adapted to receive large numbers of the shackles containing live poultry for transport on a truck or other vehicle to the processing plant.

The carts used for transporting the shackled poultry from the farm to the processing plant incorporate plural tray-like supports with each tray being adapted to receive plural shackles containing live poultry and support the poultry in an upright position during transport from the farm to the processing plant. The trays are furthermore adapted to be positioned in one position during loading of the shackles and in another position during transport to the processing plant.

At the processing plant, the mentioned carts are also adapted to be associated with an unloading conveyor which operates to unload the shackles with live poultry from the trays and convey the unloaded shackles to the processing conveyor and at the processing conveyor transfer the shackles to the processing conveyor. Thereafter, the shackles with their respective loads of live poultry are moved through the processing plant for processing in the normal manner.

DESCRIPTION OF THE DRAWINGS

FIG. 2 is a perspective view of the mechanized system for gathering and shackling the live poultry as previously disclosed in applicant's copending application Ser. No. 912,726 and shown in association with the loading conveyor and cart apparatus used at the farm.

FIG. 2A is an enlarged, fragmentary, perspective view of a bar member with slidable shackle supports forming part of the tray construction.

FIG. 2B is a perspective view of one of the slidable shackle supports used on the bar member illustrated in FIG. 2A.

FIG. 4 is a fragmentary, somewhat schematic plan view illustrating how plural shackles are transported from the carts at the plant to the processing conveyor for transfer to the processing conveyor.

FIG. 5 is a fragmentary side elevation view illustrating a plurality of the shackles on the processing conveyor after being transferred thereto and preparatory to entering the conventional processing apparatus.

FIG. 6 is a perspective view of one of the trays and one of the carts illustrating how portions of the cart are adapted for being positioned to act as a temporary support for empty trays both at the farm and the plant.

DESCRIPTION OF THE PREFERRED EMBODIMENT

Figure 1:
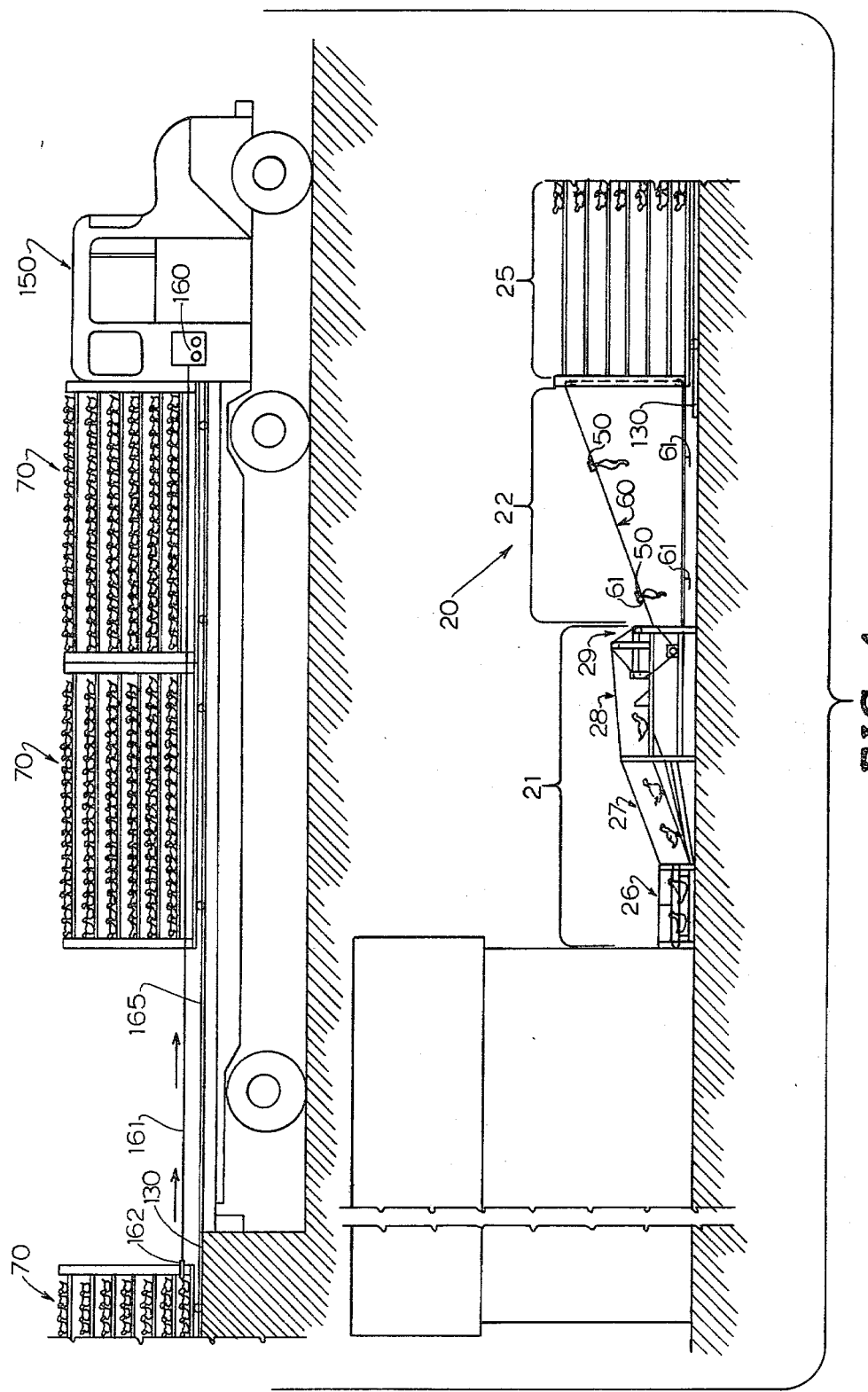
FIG. 1 is a side elevation view of the farm portion of an overall farm to plant system of the invention illustrating how the shackled live poultry are conveyed from the shackling station to the carts and also illustrating the carts being loaded onto a truck for transport to the processing plant.
Figure 3:
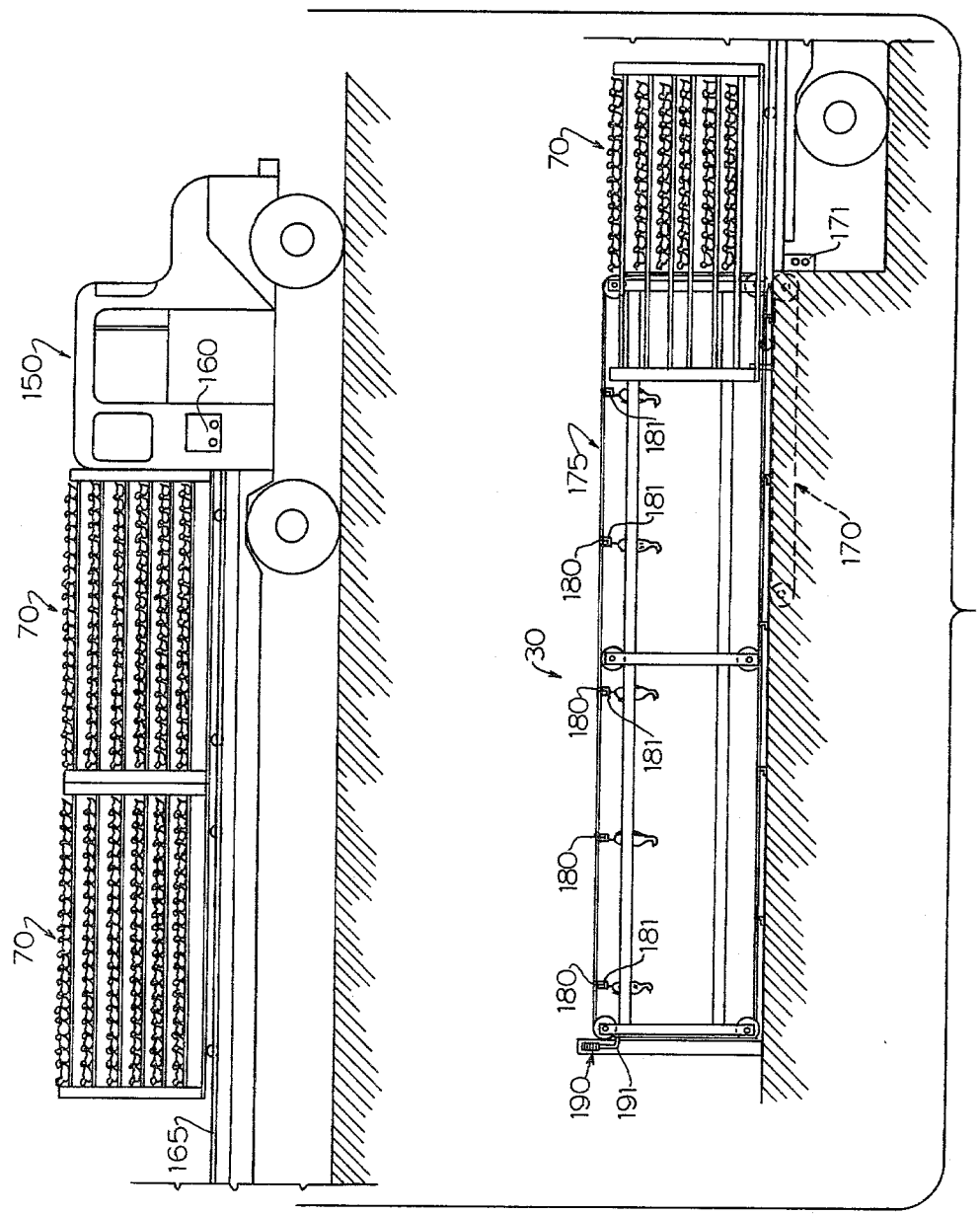
FIG. 3 is a side elevation view of the plant end of the overall farm to plant system of the invention illustrating use of a conveyor for unloading the shackles from the trays and carts for transfer to the processing conveyor.
Figure 7:
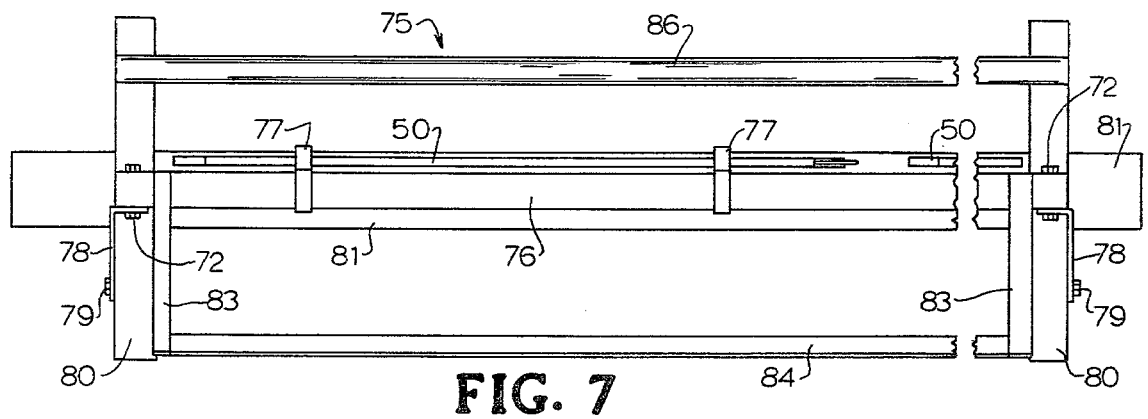
FIG. 7 is a plan view of a tray as positioned for transport but with the poultry eliminated for purposes of illustration.
Figure 8:
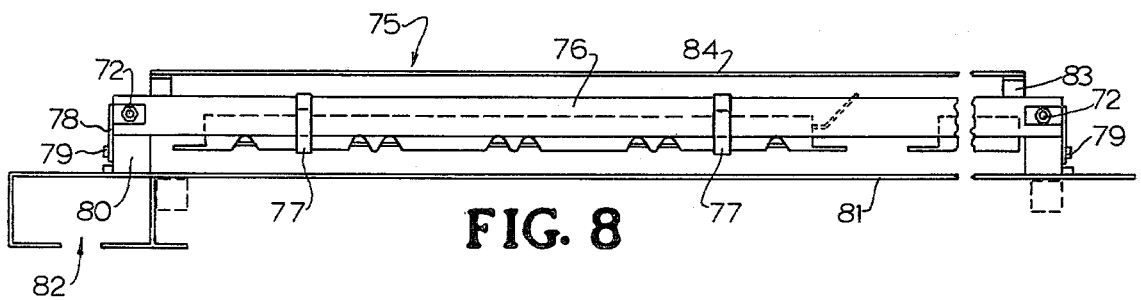
FIG. 8 is a front elevation view of a tray as it appears in the transport position but with the poultry eliminated for purposes of illustration.

Referring now to the drawings, the overall farm to plant system of the invention, generally designated 100 for reference, is made up of the apparatus at the farm end, generally designated 20, as illustrated in FIG. 1 and other apparatus, generally designated 30, at the plant end as illustrated in FIG. 3. The description will first refer to the farm end apparatus 20 and in later description will deal with the plant end apparatus 30.

Figure 11:
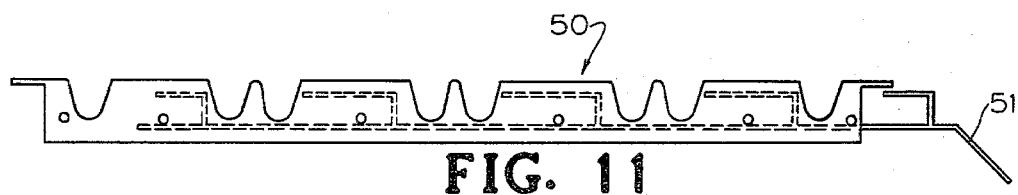
FIG. 11 is a top plan view of a shackle suited for employment with the invention and shown in an open or receiving position.
Figure 12:
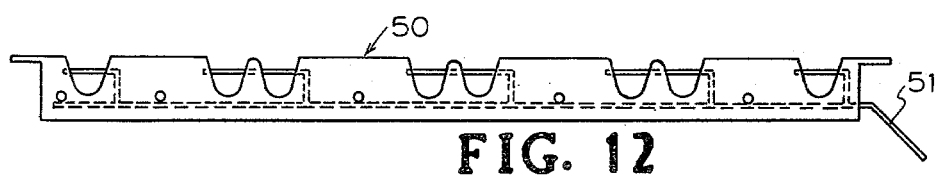
FIG. 12 is a top plan view of the shackle of FIG. 11 in a closed or shackled position and with the poultry eliminated for purposes of illustration.

The apparatus 20 at the farm end comprises a gathering and shackling apparatus 21 as previously described in applicant's copending application Ser. No. 912,726, a shackle conveying apparatus 22, forming part of the present invention and a cart transport apparatus 25 which is also a principal part of the present invention. Details of the gathering and shackling apparatus 21 may be had by reference to the description in copending application Ser. No. 912,726. However, it will be noted here that the gathering and shackling apparatus 21 includes a gathering mechanism 26, conveying mechanism 27, gating and leg guide mechanism 28 and shackling mechanism 29 all of which are fully referred to and described in the mentioned copending application Ser. No. 912,726. As described in that copending application, the mechanized system 21, although not so illustrated in FIG. 1, is intended to be capable of being mounted on wheels and pulled as a trailer from farm to farm and of being constructed for folding into a compact unit for travel. Gathering mechanism 26 groups the live poultry and directs them to the elevating conveying mechanism 27 from which the poultry are directed to the gating and shackling mechanism 28. The shackling mechanism utilizes releaseable shackle structures 50 having open and closed positions best seen in FIGS. 11 and 12. As previously described in the mentioned copending application, each shackle 50 is appropriately positioned in the shackling mechanism 29 and its securing means 51 oriented to receive and releasably secure the limbs of the poultry as they are guided into the shackle 50. Once properly positioned and with the shackle 50 fully loaded, the securing means 51 is closed, as illustrated in FIG. 12, to trap the poultry. Thus, at the output end of shackling mechanism 29, there is provided a repetitive sequence of loaded shackles 50.

With more specific reference to the present invention, the loaded shackles 50, arranged to be sequentially lifted and conveyed by means of the loading conveyor 60, seen in FIG. 1, are fitted with appropriate hooks 61 adapted to releasably grasp the individual shackles 50. From the loading conveyor 60, the individual shackles 50 having the shackled poultry are transferred to a tray and cart arrangement, the details of which are illustrated in FIGS. 2, 2A, 2B, 6 and 7-10.

The tray-cart arrangement, generally designated 70, utilizes a set of trays 75 which are adapted to reside within and be supported by the carts 70. As an illustrative embodiment, each tray 75 is adapted to receive five shackles 50 lengthwise of the tray and loaded with live poultry. The shackles 50 are supported on a front support bar 76 which mounts a plurality of slidable shackle support brackets 77. Each loaded shackle 50 is supported by a pair of the brackets 77 and ten such brackets 77 are employed on each bar 76 in the example being used for illustration. The support bar 76 is rigidly secured to pivot arms 78 which swing on bolts 79 mounted on lateral frame members 80. Frame members 80 are, in turn, mounted on a base frame 81 having at one end an open channel configuration 82 (FIG. 8) whose purpose is later explained. Arms 78 are secured to bar 76 by bolts 72.

Figures 9, 10:
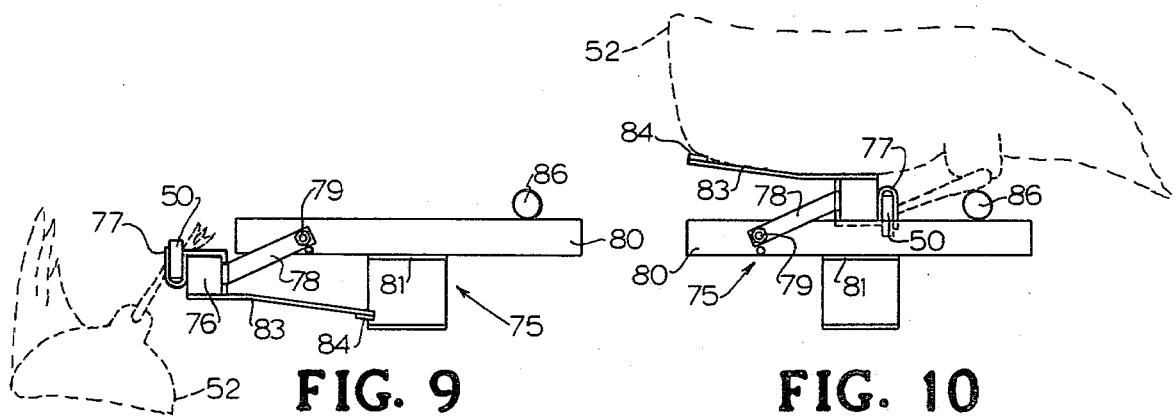
FIG. 9 is an end elevation view of the tray as positioned for loading at the farm or unloading at the plant and with poultry indicated in dashed lines.
FIG. 10 is an end elevation view of the tray as positioned for transport and with the poultry indicated in dashed lines.

Each tray 75 also includes at each end of bar 76 support arms 83 which in turn support a lengthwise extending arm member 84 designed to engage and support the breast of the poultry 52 while the legs of the poultry rest on a further support bar 86 running lengthwise of the tray 75 in the manner illustrated in FIG. 10.

From the foregoing description, it will be understood that when the tray 75 is placed in the position illustrated in FIG. 9, individual loaded shackles 50 may be transferred from the loading conveyor 60 onto a pair of shackle support brackets 77 and with ten such brackets 77 available and with each shackle bar 76 being suitably dimensioned, five such loaded shackles 50 can be placed on each bar 76. Each cart 70 on which the trays 75 are supported during transit consists of a loaded tray support section, generally designated 95, and an appended temporary foldable empty tray support section, generally designated 96, as best seen in FIG. 6. The loaded trays 75 are adapted to be supported on horizontal rails 97 extending between front and rear vertical frame members 98, 99 above lateral and longitudinal base frame members 105, 106. The empty tray support section 96 consists of foldable arms 110, cantilevered on pivot support linkages 115 adapted to support on the outer ends thereof a temporary tray support structure 120 consisting of front and rear vertical frame members 121, 121' and horizontal rails 122. Appropriate wheels 125 are provided such that cart 70 can be moved on rails 130, particularly when loaded, either at the farm or at the plant. Additional sets of wheels 135 enable the empty tray support section 96 to also be rolled on the supporting surface when necessary. When not being used, the empty tray support section 96 can be folded as illustrated in FIG. 2 with frame members 121, 121' being supported on frame members 98, 99 by means of the mating pins 140 and holes 141 illustrated in FIG. 6 and utilizing rollers 123.

In use, it will be understood that tray 75 can be manually placed into position in the loaded tray support section 95 of cart 70 one by one as needed and moved to the loading position illustrated in FIG. 2 and after being loaded moved to the appropriate lengthwise position and elevated position on the rails 97 and effectively locked to rails 97 using configuration 82 (FIG. 8) on cart 70. Alternatively, the cart 70 can be unfolded in the manner of FIG. 6, placed on rails 130, as seen in FIG. 2, at the farm and positioned near conveyor 60 as also illustrated in FIG. 2, all of the empty trays loaded in the empty tray support section 96 of cart 70 and then each tray can be brought from the empty tray storage section 96 to the loaded tray storage section 95 one by one to the loading position illustrated in FIG. 2.

To further describe the manner of loading each tray 75, all of the shackle support brackets 77 are moved to the left end of the support bar 76 as viewed in FIG. 2 and then the leading pair of shackle support brackets 77 are positioned to receive the first loaded shackle 50 from the loading conveyor 60 with the empty shackle 50 being positioned as illustrated in FIG. 9 for this loading operation. After the first loaded shackle 50 has been properly placed on the tray support bar 76, it is moved along and subsequent loaded shackles 50 are placed in other respective pairs of shackle support brackets 77 until bar 76 is loaded with five such loaded shackles 50. At this stage, the shackle bar 76 is moved to the position illustrated in FIG. 10 and the completely loaded tray 75 is then appropriately positioned on the support rails 97 both lengthwise and elevation wise on the cart 70. After cart 70 has been fully loaded in this manner, it is then winched onto the truck 150 by means of the winching mechanism 160, cable 161 and hooks 162 as illustrated in FIG. 1. In the embodiment of the invention being used for illustration, three such carts 70 are adapted to be moved on truck rails 165 so as to constitute a full truckload. After being loaded, carts 70 are appropriately secured, cable 161 is retracted into the winch mechanism 160 and truck 150 is then ready for movement to the processing plant for unloading of carts 70 as illustrated in FIGS. 3-5. In the unloading operation, essentially the reverse sequence takes place as compared to the loading operation. Making reference initially to FIG. 3, the first loaded cart 70 to be unloaded is moved so as to engage appropriate hooks, or the like, not shown, on a powered conveyor 170 having suitable controls 171 enabling conveyor 170 to be indexed such that the loaded cart 70 can be gradually indexed, vertical tray row by vertical tray row, towards the unloading conveyor 175 as best seen in FIG. 3. Unloading conveyor 175 is equipped with appropriate support bars 180 and hooks 181 such that when the trays 75 are moved to the unloading position illustrated in FIG. 9, the unloading support bars and hooks 181 are adapted to engage five loaded shackles 50 simultaneously and move the same towards the processing conveyor 190. Processing conveyor 190 is equipped with sets of mating support hooks 191 adapted to receive the loaded shackles 50 in serial arrangement as further illustrated in FIG. 4 and FIG. 5. During the unloading operation, each cart 70 can be unfolded in the configuration of FIG. 6 and, thus, as each individual tray 75 is unloaded, the empty tray can be moved to the empty tray support section 96 illustrated in FIG. 6 for temporary support until all of the trays 75 have been unloaded and the particular cart 70 is completely empty. At this stage, the empty cart 70 can be refolded to the configuration illustrated in FIG. 2 and after all of the three loaded carts have been unloaded onto the unloading conveyor 175 in the manner previously described, the three now empty carts 70 can be transferred back to the truck 150 for return to the same or another farm for reloading of the trays 75 as previously described.

In summary, it can be seen that the present invention system 100 represents a further significant advance over the method and apparatus of applicant's prior U.S. Pat. No. 3,796,192 and a further significant advance over the subject matter of applicant's copending application Ser. No. 912,726 as well. More specifically, there has been provided a system enabling a plurality of loaded shackles to be conveyed to and loaded on individual trays specifically adapted to be supported in plural numbers on carts specially adapted for transport on a truck or other vehicle to the poultry processing plant. At the poultry processing plant, it will also be seen that the invention method and apparatus provides a cart and tray arrangement which can be quickly unloaded by unloading plural loaded shackles sequentially and transferring such plural loaded shackles in time sequential relation to the processing conveyor for processing in the conventional manner. The shackles 50, once unloaded in the processing plant, are reusable. The individual trays 75 and carts 70 may also be treated as relatively long life pieces of equipment with proper care. Thus, another advantage of the invention is that the truck can return to the farm loaded with empty carts, empty trays and empty shackles for complete reuse and recycling through the loading, transport and unloading operation as described in the foregoing description. The trays thus provide reusable transport devices which are compatible with the loading and shackling apparatus of applicant's prior copending application Ser. No. 912,726 and the cart provide temporary and reusable storage frames compatible with the truck and which lend themselves to storing large numbers of the transport devices, i.e., the trays, thus insuring that large numbers of fowl can be transported with each load. It is, of course, recognized that vehicles other than trucks, e.g., freight cars, could be equipped for handling the carts described.

What is claimed is:

1. Apparatus for handling live poultry between the farm and processing plant, comprising:
    (a) a plurality of elongated shackle structures each having laterally spaced limb securing means adapted to receive and releasably secure laterally spaced paired limb portions of plural fowl simultaneously in a side-by-side array;
    (b) a transport device for transporting said plurality of shackle structures, comprising:
        (i) an elongated base frame; and
        (ii) interconnected with said base frame, elongated positionable frame members extending lengthwise of said base frame, said positionable members including a bar member extending lengthwise of said base frame and having shackle structure support means mounted on and movable relative thereto; said frame members adapting said transport device in one loading position of said frame members to releasably receive said plurality of shackle structures each loaded with shackled live fowl and aligned lengthwise of said base frame and in another transport position to hold said shackle structures releasably secured with selected parts of said fowl supported and said fowl upright for transport; and
    (c) storage frame means adapted to receive and individually support a plurality of said transport devices during transit between said farm and processing plant.

2. Apparatus as claimed in claim 1 wherein said selected support parts comprise the breast and legs of said fowl and selected said positionable members are arranged to provide such support.

3. Apparatus as claimed in claim 1 wherein said shackle support means comprises a plurality of slidable shackle support means mounted on said bar member and having one portion shaped to conform to and adapted to receive a said shackle structure and integral with said one portion another portion loosely surrounding said bar member for sliding thereon and with each pair of said shackle support means being adapted to support one of said shackle structures with the fowl shackled thereon being suspended therefrom.

4. Apparatus as claimed in claim 1 including:
    (a) powered loading apparatus having means for mechanically transporting and directing live fowl on foot from one station having the live fowl on foot to a shackling station separated therefrom and provided by said apparatus and at said shackling station being adapted to load said shackle structures sequentially with selected said fowl therein; and (b) conveying means adapted to convey the loaded said shackle structures away from said shackling station in timed sequence with the loading thereof to said storage frame means for storage therein.

5. Apparatus as claimed in claim 4 including a vehicle adapted to transport a plurality of the loaded said storage frames between said farm and plant and at the plant including other conveying means adapted to convey plural said shackle structures loaded with said fowl from the said transport devices stored in said said storage frame means for transfer to a processing conveyor at said plant.

6. Apparatus as claimed in claim 1 wherein said storage frame comprises a main frame structure with laterally spaced sides formed by vertically spaced horizontal rails extending between vertical frame members, said rails being adapted to support a plurality of said transport devices in a vertical tiered array by engagement with outer end portions of the said base frames thereof.

7. Apparatus as claimed in claim 6 wherein said storage frame means includes auxiliary structure associated therewith and having other auxiliary vertically spaced horizontal rails extending between other vertical frame members and providing in association with the said rails of said main frame structure means for temporary storage of a plurality of empty said transport devices.

8. The method of handling live poultry between farm and processing plant and in processing comprising the steps:

(a) releasably securing each fowl in an elongated shackle structure adapted to receive and releasably secure a plurality of said fowl simultaneously with paired limb portions thereof held in a side-by-side array;

(b) placing and releasably securing a plurality of said shackle structures on an elongated transport device with the shackle structures aligned lengthwise of and supported by the transport device in a first position and thereafter repositioning said transport device with said fowl having selected parts thereof supported by said transport device and with the fowl being upright for transport;

(c) transporting a plurality of said transport devices in a storage frame means adapted for being transported between said farm and said processing plant;

(d) at the processing plant unloading each said transport device sequentially and transferring each plurality of shackle structures therefrom as a group of shackle structures to a processing conveyor at said plant;

(e) continuing the unloading of said storage frame means until all of said transport devices have been unloaded of said shackle structures; and (f) processing the fowl placed on said processing conveyor at said processing plant.

9. The method of claim 8 including the step of utilizing a truck adapted to receive and transport a plurality of said storage frame means loaded with said transport devices between said farm and said plant.

* * * * *